United States Patent [19]

Nadler et al.

[11] 4,080,791

[45] Mar. 28, 1978

[54] FUEL CELL POWER GENERATING STATIONS

[75] Inventors: Murray Nadler, Morris Plains; Robert P. Cahn, Millburn, both of N.J.

[73] Assignee: Exxon Research & Engineering Co., Linden, N.J.

[21] Appl. No.: 756,183

[22] Filed: Jan. 3, 1977

[51] Int. Cl.² .................. F01K 27/00; H01M 8/04
[52] U.S. Cl. ........................ 60/670; 429/12; 60/721
[58] Field of Search ............. 429/12, 13, 17, 18, 429/39; 60/670

[56] References Cited

U.S. PATENT DOCUMENTS 3,972,731  8/1976  Bloomfield et al. .................. 429/17

Primary Examiner—John H. Mack
Assistant Examiner—H. A. Feeley
Attorney, Agent, or Firm—Joseph J. Dvorak

[57] ABSTRACT

An integrated power generating plant includes a fuel cell for generating electrical energy directly, an auxiliary power generating plant that utilizes both the sensible heat and the heating value of effluents from the fuel cell by using working fluids in a closed cycle. The working fluid is vaporized by sensible heat and is superheated by combusting incompletely reacted fuels from the fuel cell.

9 Claims, 2 Drawing Figures

FUEL CELL POWER GENERATING STATIONS

BACKGROUND OF THE INVENTION

The present invention relates to fuel cells, and more particularly to a fuel cell generating station.

Fuel cells have been proposed as an alternative to fossil fuel fired generators. These suggestions are frequently made on the basis that conventional fossil fuel generators have efficiencies that approach 40% as an upper limit while fuel cells can theoretically reach efficiency levels twice that of conventional power generating equipment. In practice, full realization of the potential improvements in the theoretical efficiency of fuel cells is rarely achieved for technological reasons. Complete utilization of the fuel, for example, results in very low current densities due to the onset of concentration polarization or requires costly recovery of incompletely reacted fuel for subsequent recycling.

BRIEF SUMMARY

Generally speaking, the present invention relates to an integrated power generating plant. The plant includes a fuel cell for directly generating electrical energy, which produces a partially reacted fuel effluent, and an auxiliary electrical energy generating system including an electric generator and a thermal engine for driving the electric generator. The sensible heat and the heating value of the fuel cell effluents including unreacted fuel are utilized to power the thermal engine.

DETAILED DESCRIPTION

Figure 1:
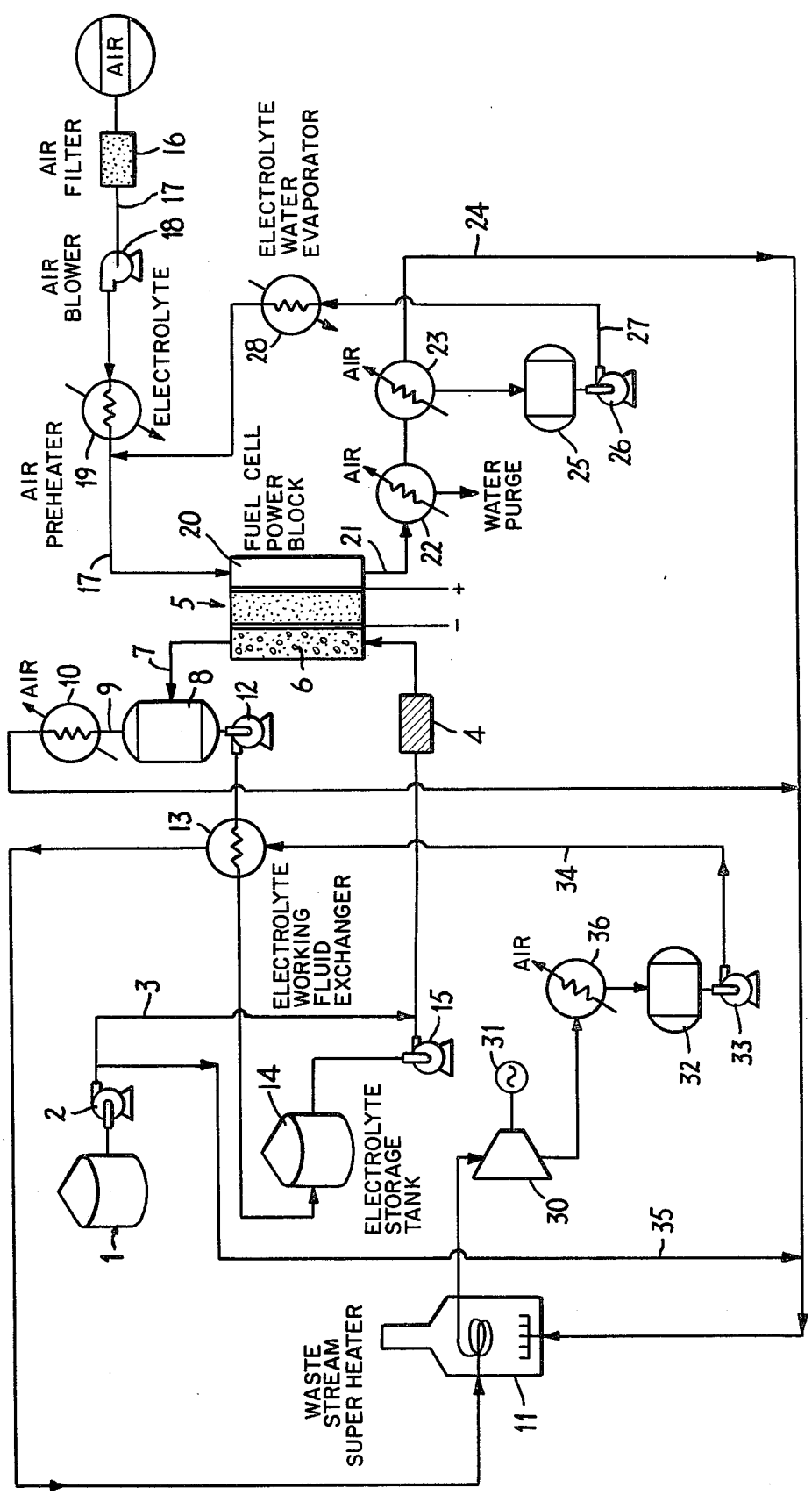
FIG. 1 is a schematic flow sheet of an integrated power generating plant in which methanol is used as a fuel in a fuel cell and unreacted methanol from the fuel cell is recycled to a super-heating operation for generating auxiliary power.

The improved integrated power plant of the present invention comprises a low temperature fuel cell for reacting gaseous hydrocarbons to generate electrical energy directly and an auxiliary electrical energy generating system including an electrical generator and a thermal engine that utilizes both the sensible heat and the heating value of the fuel cell effluents.

The fuel cell is advantageously a low temperature cell wherein a gaseous hydrocarbon is reacted with oxygen. As used herein, the term "low temperature" fuel cell or cell refers to fuel cells that employ aqueous electrolytes which operate between ambient and boiling temperature of the electrolyte under the operating conditions of the cell. Major advantages flowing from the use of low temperature cells include less severe construction materials problems, less corrosion, lighter weight materials can be used, ease in sealing for super-atmospheric operation and rapid start-up.

Certain inefficiencies are encountered in the operation of low temperature fuel cells. The lower reaction rates inherent in low temperature operations can be partially compensated for by maintaining high concentrations of the reactants in order to provide reasonably attractive current densities. However, maintenance of high reactant concentrations requires high throughput rates with the effluents containing significant heat values in the form of unreacted fuel. Although the unreacted fuel could be separated from the effluent and recycled to the fuel cell, such separation processes are quite complex and costly. Separation and recovery of the unreacted fuel has the additional disadvantage of not recovering the sensible heat of the effluents. Oxidation of fuel in a fuel cell generates both electrical and thermal energy. The heat released by the oxidation of the fuel in the fuel cell reports as sensible heat in the effluents of the cell. It is difficult to utilize this sensible heat because of its low temperatures which provide very low Carnot efficiencies. An advantageous embodiment of the present invention uses the sensible heat contained in the cell effluents in a more efficient manner.

Sensible heat in the cell effluents is used to vaporize the working fluid that is circulated in a closed cycle which includes vaporization, super-heating, expansion in a thermal engine and subsequent liquification. The efficiency of heat utilization in vaporizing the working fluid is not limited by the Carnot efficiency but by heat exchange considerations. As long as the vaporization temperature of the working fluid is less than or equal to the cell effluent, heat from the effluent will flow to the working fluid thereby supplying the latent heat of vaporization of the working fluid. Once the sensible heat is recovered from the cell effluents, the vaporized working fluid is super-heated and then passed through a thermal engine. The super-heating step heats the working fluid vapor to a sufficiently high temperature that the Carnot efficiency is significantly higher. The direct generation of electrical energy in the fuel cell plus the recovery and use of the sensible heat and the heat value of the fuel cell effluents increases the overall efficiency of fuel utilization to at least about 45%, and preferably at least about 50%.

The sensible heat from the fuel cell can be available from one to four sources. In most instances, fuel cells will provide at least two gaseous effluents — the partially reacted fuel stream and the partially utilized oxygen stream, from which sensible heat can be realized. The electrolyte can also be a source of sensible heat in the form of one or more liquid effluents, depending upon the structure and operation of the fuel cell. The gaseous effluent can be treated to strip water vapor and then, still containing some sensible heat, lead to a burner to super-heat the vaporized working fluid. Any excess sensible heat not required for vaporizing the working fluid can be used to preheat supplemental fuel and/or air for the auxiliary generating unit.

One embodiment of the present invention is illustrated in FIG. 1. A fuel, methanol, is stored in tank 1 from where it is conveyed by pump 2 through a suitable valve in pipe 3 through electrolyte filter 4 to a conventionally designed fuel cell 5. A solution of methanol and an electrolyte is fed to anode chamber 6 of fuel cell 5. The methanol is partially oxidized in fuel cell 5, generating electrical energy, heat, and an effluent containing electrolyte and unoxidized methanol. The heat generated during oxidation vaporizes a portion of the unoxidized methanol so that the effluent from the anode chamber is a gas-liquid mixture of methanol, water vapor, and electrolyte. This mixture is conveyed via conduit 7 to holding tank 8 where the methanol water vapor is allowed to separate into a methanol vapor stream and an electrolyte stream. The methanol stream is conveyed through line 9 and heat exchanger 10 and then to super-heater 11. The electrolyte is pumped by pump 12 through heat exchanger 13 to electrolyte storage tank 14. Electrolyte from tank 14 is recycled to fuel cell 5 by pump 15.

An oxygen-bearing gas, air, is cleaned by air filter 16 and conveyed through pipe 17 by blower 18 and through pre-heater 19 to fuel cell 5 after being mixed with electrolyte. The mixture of air and electrolyte is fed to cathode chamber 20 where a portion of the oxygen is consumed by reaction with the methanol. A mixture of partially combusted air and electrolyte is removed from fuel cell 5 by pipe 21. The stream of partially combusted air in the electrolyte is passed through heat exchangers 22 and 23. In heat exchanger 23, electrolyte and partially combusted air are separated with the partially combusted air being conveyed to super-heater 11 via pipe 24 and the electrolyte being conveyed to storage tank 25. Electrolyte from tank 25 is pumped by pump 26 through line 27 through heat exchanger 28 where water is evaporated from the electrolyte to control the composition thereof. The electrolyte of adjusted composition is conveyed via pipe 17 to be mixed with incoming preheated air which mixture is fed to fuel cell 5.

Heat exchangers 10, 13, 22 and 23 recover a part of the sensible heat generated in fuel cell 5. The heating value of the unreacted methanol in the fuel cell effluent, as well as a part of the sensible heat of the effluent, is ultimately recovered by thermal engine 30 which in turn powers electrical generator 31. Thermal engine 30, a turbine for example, is operated by the vapor of a working fluid which is cycled in a closed circuit and is stored in tank 32. Working fluid in tank 32 is conveyed by pump 33 via line 34 to heat exchanger 13 in which the sensible heat from the electrolyte from the anode chamber 6 is used to vaporize the working fluid. The vaporized working fluid is then heated in super-heater 11 to an elevated temperature so that the Carnot efficiency of the thermal engine is significantly increased. Partially combusted methanol and partially combusted air plus auxiliary fuel from tank 1 via pipe 35 are combusted in super-heater 11 to provide any required additional heat. The thermal energy of the heated working fluid vapor is partially recovered in thermal engine 30. After passing through thermal engine 30, the working fluid is passed through heat exchanger 36 and then back to tank 32.

Figure 2:
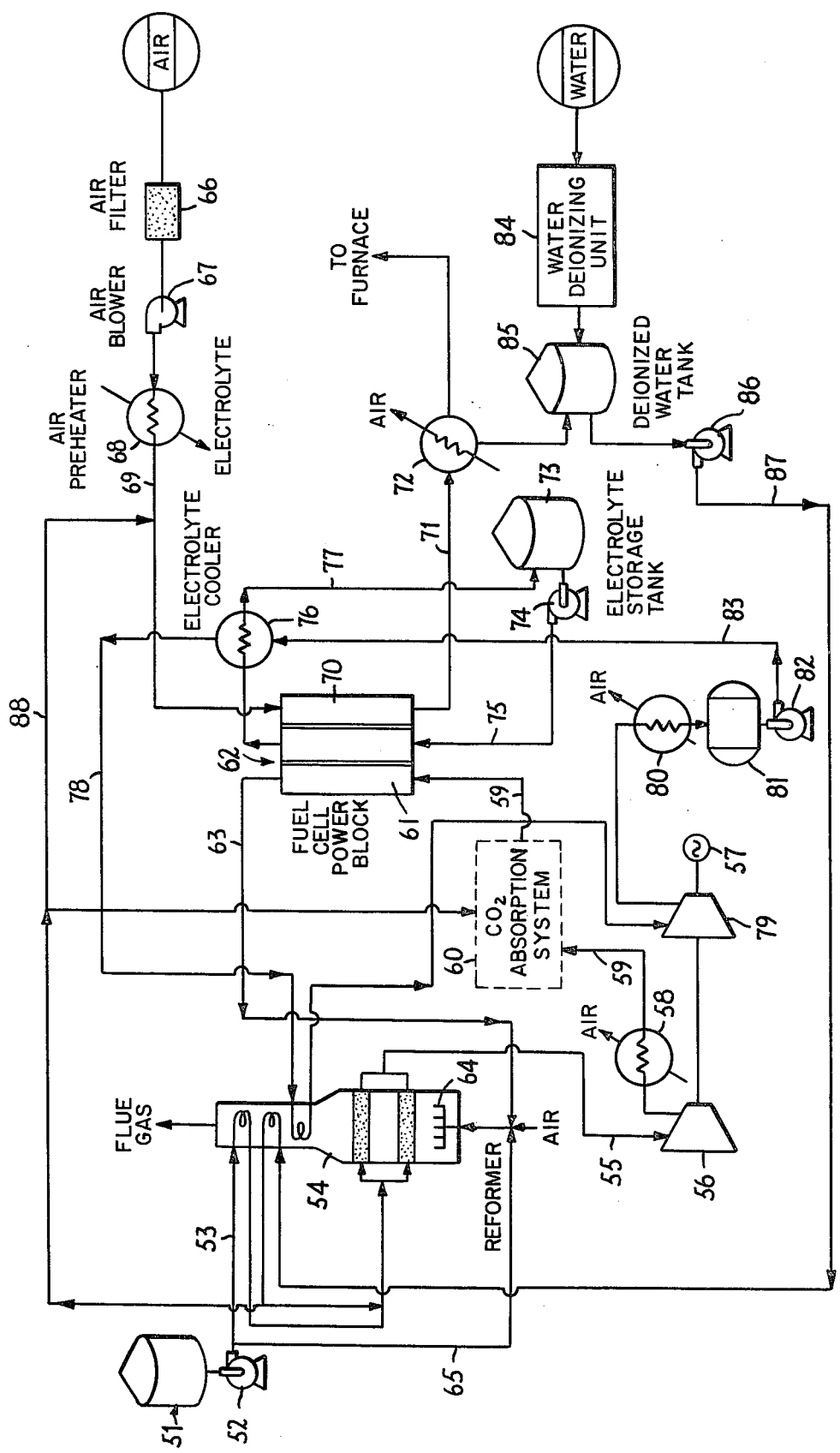
FIG. 2 is a schematic flow diagram of another embodiment for using methanol in which the methanol is first reformed to produce carbon dioxide and hydrogen which are reacted in a fuel cell and the heating value of the fuel from fuel cell effluents is utilized for operating the reformer and for generating auxiliary power.

FIG. 2 illustrates another embodiment of the present invention. A fuel such as methanol is stored in tank 51. Methanol is pumped by pump 52 via line 53 through the flue gas stack of reformer 54 to be preheated. After the methanol is preheated it is reformed in reformer 54 to produce a reformed gas containing carbon monoxide and hydrogen at elevated temperatures. The reformer gas is fed via line 55 to thermal engine 56 which converts thermal energy into mechanical energy which in turn powers electrical power generator 57. After expansion in thermal engine 56, the reformer gas is cooled further by passage through heat exchanger 58. As carbon dioxide may be formed in the refining operation, and it is carbon dioxide that is a reaction product in the fuel cell, the efficiency of the fuel cell can be optionally improved by removing carbon dioxide as shown by the broken line carbon dioxide absorption system 60. If carbon dioxide removal is not required or desired, the reformer gas from heat exchanger 58 can be fed directly to anode chamber 61 of the fuel cell 62 via line 59. The decision as to whether or not a carbon dioxide absorption system should be employed turns upon the type of electrolyte used in fuel 62, e.g., if the electrolyte is carbon dioxide absorbing then the optional carbon dioxide absorption system 60 would be utilized. The reformed gas is partially oxidized in fuel cell 62 and the gaseous effluents containing unreacted carbon monoxide and hydrogen are fed via line 63 to burner 64 of reformer 54 where both the sensible heat and the heating value of the stream containing the unreacted hydrogen and carbon monoxide are recovered. Any additional heat required to heat reformers 54 can be obtained from any extraneous source, e.g., the methanol used as feedstock can be fed to burner 64 via line 65.

Oxygen to support the reaction in fuel cell 62 can be air which is passed through air filter 66 by blower 67, it is preheated in heat exchanger 68 and then fed to cathode chamber 70 of fuel cell 62 via line 69 after being mixed with water or electrolyte via line 88. Only a portion of the oxygen in the air is reacted and the gaseous effluent is conveyed via line 71 to heat exchanger 72 from which remaining sensible heat can be recovered by use of a gas to support combustion in reformer 54.

Electrolyte stored in tank 73 is pumped by pump 74 through line 75 to fuel cell 62. Sensible heat from the reaction occurring in the fuel cell is in part recovered by passing the electrolyte effluent to heat exchanger 76 from where the electrolyte is returned to storage via line 77.

Sensible heat recovered from electrolyte effluent in heat exchanger 76 is used to vaporize working fluid which is circulated in a closed cycle. Vaporized working fluid from heat exchanger 76 is conveyed via line 78 to the flue stack of reformer 54 where it is super-heated. The thermal energy in the super-heated working fluid is recovered as mechanical energy in thermal engine 79 which in turn powers generator 57. After being expanded in thermal engine 79, the working fluid is liquified in heat exchanger 80 and then stored in tank 81 from where pump 82 conveys working fluid via line 83 to heat exchanger 76.

Water for the reforming reactions and for carbon dioxide absorption, when practiced, is advantageously deionized in unit 84 and stored in tank 85. Another source of deionized water is water recovered from the gaseous effluent from cathode chamber 70. Deionized water from either source is pumped by pump 86 via line 87 to the flue stack of reformer 54 where the water is preheated. The preheated water is used for the reforming reaction and a portion can also be used in the carbon dioxide absorption system 60 if carbon dioxide absorption is being used. An important aspect of the present invention is the use of the low temperature sensible heat generated in the fuel cell as a latent heat of vaporization of a working fluid that is circulated in a closed circuit. The choice of the working fluid is an important factor. The working fluid should have a boiling temperature at the evaporating pressure less than or equal to the temperature of the fuel cell effluent. Other properties that the working fluid should have include thermal stability so it will not decompose while operating over the expansion cycle, and a suitable vapor pressure-temperature relationship so that it can be easily condensed with cooling water or ambient air at the lower pressure of its expansion cycle. Specific examples of materials that can be used as working fluid include methanol, water, ammonia, hydrocarbons having about 3 to 8 carbon atoms, fluorocarbon refrigerants and aerosols, and the like.

What is claimed is:

1. An integrated power generating plant comprising a fuel cell for partially reacting a fuel to directly generate electrical energy and to produce a partially reacted fuel effluent; and an auxiliary electrical generating system including an electric generator and a thermal engine for driving an electric generator; means for completely combusting the partially reacted fuel effluent to supply heat to the thermal engine, said thermal engine employing a working fluid in a closed cycle in which liquid working fluid is vaporized, super-heated, expanded in the thermal engine and finally liquified.

2. The integrated power plant as described in claim 1 including means or vaporizing the working fluid with a portion of the sensible heat contained in the fuel cell effluents.

3. The integrated power plant described in claim 1 including means for recovering the sensible heat in the electrolyte effluent from the fuel cell.

4. The integrated power plant described in claim 3 including means for directly mixing fuel with fuel cell electrolyte for introduction into the fuel cell, means for separating a gaseous stream containing unreacted fuel from the fuel cell electrolyte effluent and a burner for combusting unreacted fuel in the gaseous stream to super-heat the vaporized working fluid.

5. The integrated power plant described in claim 2 including reactor means for reacting the fuel to produce a gaseous fuel stream containing carbon monoxide and hydrogen, the reactor means being equipped with a burner for combusting unreacted carbon monoxide and hydrogen from the fuel to generate heat for the reaction and with means for super-heating the vaporized working fluid by the waste heat from the reactor means.

6. The integrated power plant described in claim 2 including means for supplying supplemental fuel to the burner to provide auxiliary heat for both the reaction and the super-heating of the vaporized working fluid.

7. The process as described in claim 5 wherein the fuel cell employs a carbon dioxide absorbing electrolyte including means for absorbing carbon dioxide from the gaseous fuel stream and from the electrolyte.

8. The integrated power plant as described in claim 1 wherein the working fluid is a member selected from the group consisting of methanol, water, hydrocarbons having from about 3 to 8 carbon atoms and fluorocarbon refrigerants.

9. The integrated power plant as described in claim 6 including means for converting the thermal energy of the gaseous fuel stream from the reactor to mechanical energy.

* * * * *